United States Patent [19]
Line

[11] Patent Number: 5,179,865
[45] Date of Patent: Jan. 19, 1993

[54] INFINITELY VARIABLE TRANSMISSION

[75] Inventor: Richard J. Line, Sterling Heights, Mich.

[73] Assignee: The United States of America as represented by the Secretary of the Army, Washington, D.C.

[21] Appl. No.: 825,894

[22] Filed: Jan. 27, 1992

[51] Int. Cl.⁵ ............................................. F16H 15/20
[52] U.S. Cl. ......................................... 476/51; 476/22
[58] Field of Search ......................... 74/193, 205, 216

[56] References Cited

U.S. PATENT DOCUMENTS

| | | | |
|---|---|---|---|
| 118,650 | 8/1871 | Sherman | 74/193 |
| 701,162 | 5/1902 | Dawson | 74/193 |
| 1,116,373 | 11/1914 | Besserdich | 74/193 |
| 1,176,550 | 3/1916 | Haywood | 74/193 |
| 1,318,588 | 10/1919 | Preston | 74/193 |
| 1,477,052 | 12/1923 | Gibbs | 74/193 |
| 2,461,258 | 2/1949 | Brooks | 74/193 X |
| 2,865,213 | 12/1958 | Pernollet et al. | 74/193 |
| 3,286,537 | 11/1966 | Riley | 74/193 |

FOREIGN PATENT DOCUMENTS 282961  9/1990  Fed. Rep. of Germany ........ 74/193

Primary Examiner—Allan D. Herrmann
Attorney, Agent, or Firm—Peter A. Taucher; David L. Kuhn

[57]  ABSTRACT

The invention is an infinitely variable transmission having a frusto-conical impeller mounted on a block alongside a frusto-conical roller, the smaller end of the impeller being opposite the larger end of the roller. The transmission includes a wheel translatable along the impeller and roller, the wheel contacting both the impeller and roller in a selected set of wheel positions so that the wheel transfers rotary motion of the impeller to the roller. The transmission includes a mechanism to adjust the translation path of the wheel to compensate for wheel wear and a mechanism to vary the pressure with which the wheel contacts the impeller and roller.

6 Claims, 4 Drawing Sheets

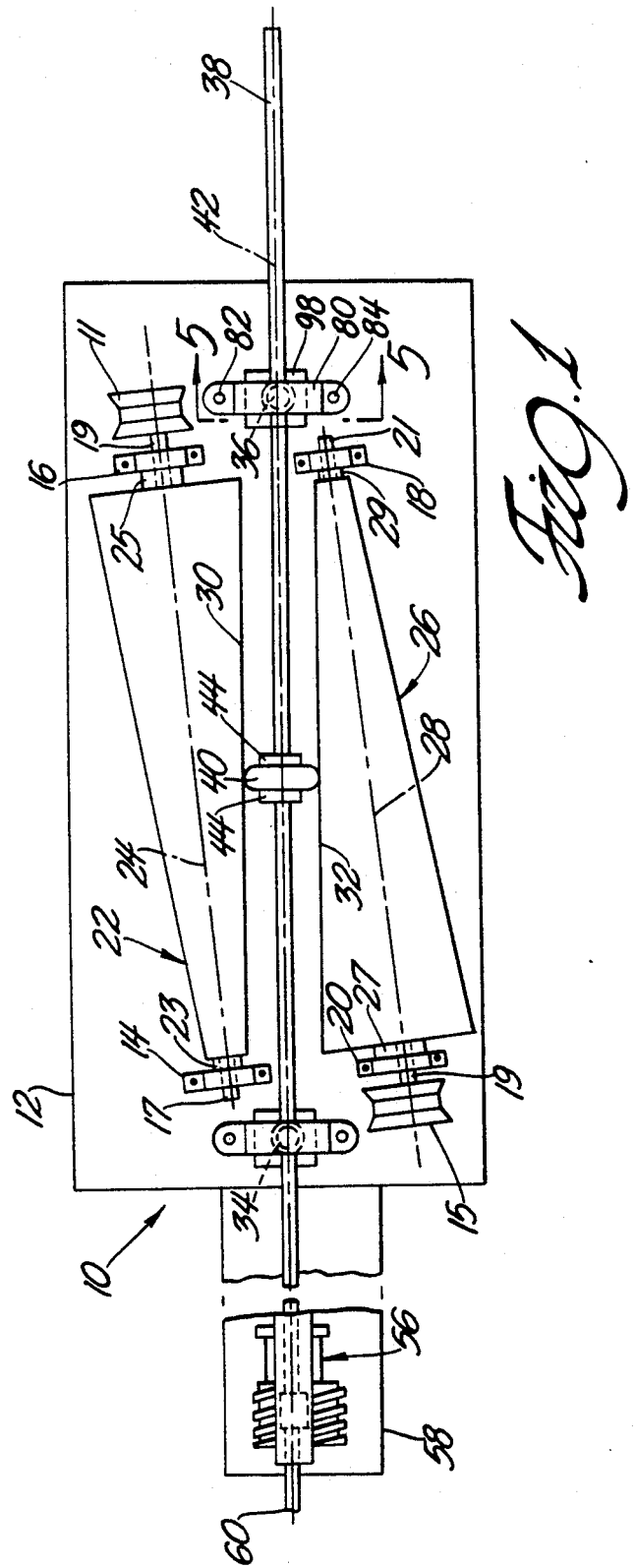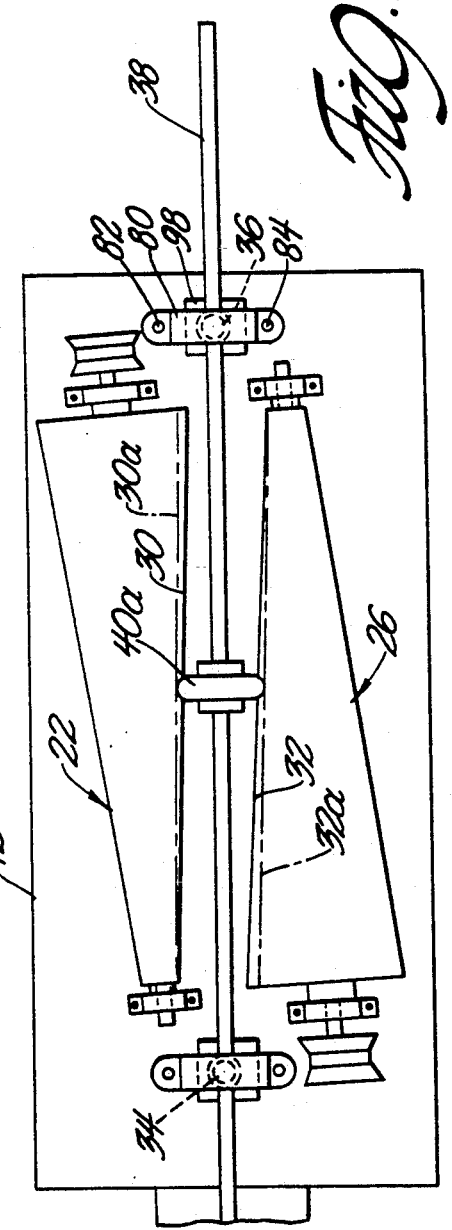

INFINITELY VARIABLE TRANSMISSION

GOVERNMENT USE

The invention described herein may be manufactured, used and licensed by or for the U.S. Government for governmental purposes without payment to me of any royalty thereon.

BRIEF DESCRIPTION OF THE DRAWINGS

FIG. 1 is a plan view of the first embodiment of my transmission. Some details of the connection between the posts and the base are omitted for clarity.

FIG. 1A is another plan view of the first embodiment showing a variation in the position of the spindle shaft upon which a transfer wheel translates.

BACKGROUND AND SUMMARY

Figure 2:
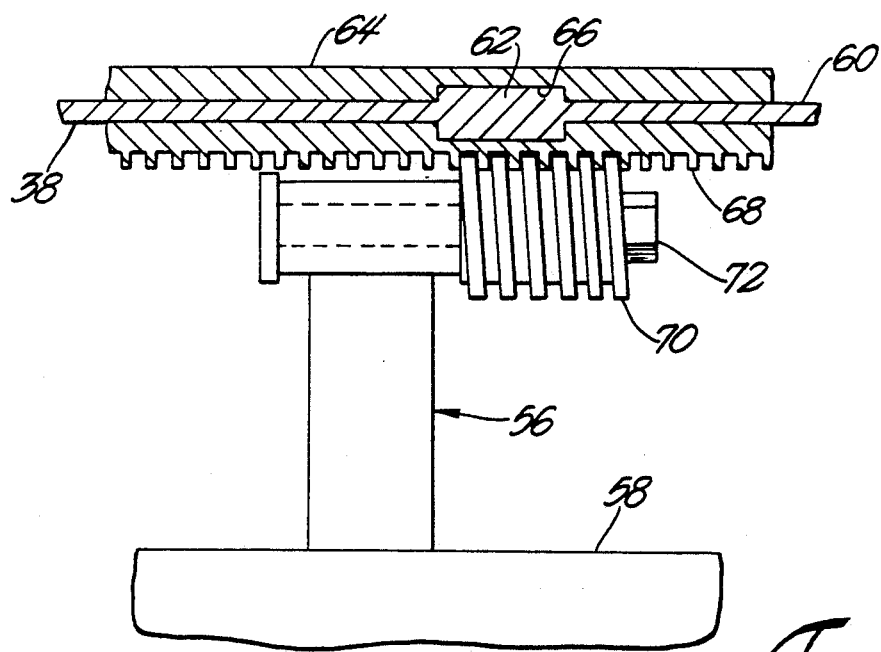
FIG. 2 is a side elevational view of a mechanism for translating the wheel and spindle shaft of the first embodiment.

My invention relates to devices for transferring mechanical power and more particularly relates to infinitely variable transmissions which transfer rotational power in a drive train. My transmission can be used, for example, in small automotive vehicle drive trains and vehicle power takeoffs, in wind or water operated generators, or other machinery where it is desired to have fine gradations in the ratio of driving rotational element speed to driven rotational element speed.

My transmission has two frusto-conical rotating elements mounted alongside each other on a block, the smaller end of one element being opposite the larger end of the other element. One element, an impeller, receives power from a motor or other source and causes the other element, a roller, to rotate and thereby give power to a mechanical output. A transfer wheel is also rotatably mounted to the block, the wheel being translatable along the rotating elements and being in contact with the rotating elements during at least a portion of its translation path. The elements are juxtaposed such that the wheel's translational path can be straight while maintaining a selected, essentially constant contact force on both rotational elements.

My transmission advantageously includes a means for controlling and varying the selected constant force, this means being incorporated in the mounts for the shaft or spindle shaft about whose axis the wheel rotates. The transmission has a "neutral" mode wherein the transfer wheel contacts only one or neither of the rotating elements, whereby the transmission transfers no power. The transmission has a "reverse" mode wherein the driven elements rotates opposite the direction it takes during a the "forward" mode. which occurs whenever the transfer wheel contracts both rotating elements.

DETAILED DESCRIPTION

One embodiment of my infinitely variable transmission 10 is shown in FIG. 1 having pillow block 12 forming a base to which mounts 14, 16, 18 and 20 are fixed. Journalled in mounts 14 and 16 are shafts 17 and 19 of frusto-conically shaped rotating impeller 22, the impeller and its shafts having an axis of rotation 24. Similarly journalled between mounts 18 and 20 are shafts 19 and 21 of frusto-conically shaped roller 26, the roller and its shafts having an axis of rotation 28. The mean diameter of roller 26 is preferably as much larger as is possible than the mean diameter of impeller 22. Impeller 22 is spaced from its mounts by bushings 23 and 25 while roller 26 is spaced from its mounts by bushings 27 and 29. Power is supplied to impeller 22 by a belt drive (not shown) engaged to pulley 11 and power is output from transmission 10 via pulley 15. Impeller 22 and roller 26 are juxtaposed so that tangent line 30 on the surface of impeller 22 is parallel to tangent line 32 of roller 26, the smaller end of impeller 22 being opposed to the larger end of roller 26 and the larger end of impeller 22 opposed to the smaller end of roller 26. For this embodiment it is preferred that the axes of the roller and impeller be parallel and that the angle between axis 24 and the tangent line 30 be equal to the angle between axis 28 and the tangent line 32.

Variable-height posts 34 and 36 are received in block 10 and have through bores to accommodate rotation and translation of spindle shaft 38 relative to the posts. Fixed to the spindle shaft is transfer wheel 40 which has axis 42 in common with the spindle shaft and which essentially tangentially contracts both impeller 22 and roller 26. Axis 42 is parallel to target lines 30 and 32 so that wheel 40 remains in essentially tangent contact with the impeller and roller as wheel 40 translates along axis 42.

Figure 3:
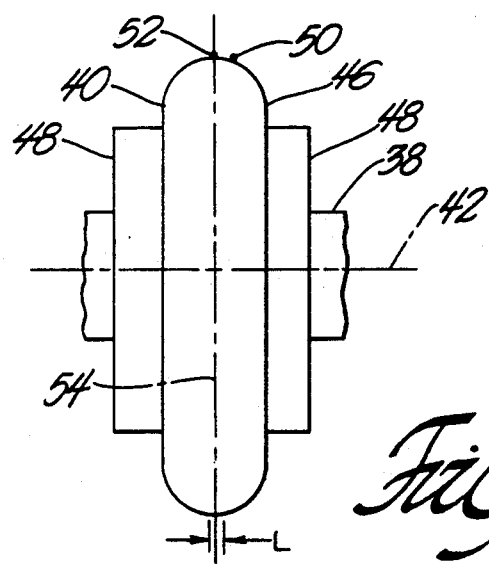
FIG. 3 is an enlarged plan view of the transfer wheel.

As seen in FIG. 3, wheel 40 has a semicircular outer diametrical surface 46 and is sandwiched between two circular reinforcing flats 48. Wheel 40 can be made of a material more pliable than the material roller 26 and impeller 22, the wheel being fabricated, for example, of hard rubber. When surface 46 presses against the roller or the impeller, surface 46 deforms so that a limited area contact having width "L" is established instead of point contact, thereby inhibiting rotational slip between wheel 40 and either the roller or the impeller. Flats 48 prevent deformation of the central area of wheel 40 so that wheel 40 acts as a rigid body except for the annular zone at surface 46.

Refer now to point 50 on surface 46 and assume that surface 46 presses against impeller 22 such that surface 46 flattens sufficiently for point 50 to contact the impeller. Point 50 is remote from point 52 at the intersection of surface 46 and bisector line 54 which divides wheel 40 into two identical halves. Point 52 will contract a corresponding point on impeller 22 and will have the same instantaneous velocity as the corresponding point. Point 50 will have contact another corresponding point on impeller 22 but will have different instantaneous velocity than said other corresponding point. Consequently, there will be abrasive slippage between surface 46 and the impeller in the region of point 50, the degree of slippage being greater as the distance of point 50 from line 54 increases. A similar phenomenon will occur in the engagement of wheel 40 with roller 26. The slippage will cause wear on wheel 40 and will cause friction with the wheel by the impeller and the roller. For this reason it is preferred that width "L" be as small as possible consistent with effective transfer of power from the impeller through the wheel to the roller.

Any suitable means may be employed for translating spindle shaft 38 along axis 42 and one such means is exemplified by worm assembly 56 in FIG. 2, where spindle shaft portion 60 has a cylindrical enlargement 62 fit closely but rotatably within shallow annular channel 66 of sleeve 64. Integral with sleeve 64 are spaced rack teeth as at 68, these teeth being engaged with worm gear 70 so that rotation of gear 70 translates spindle shaft 38. Hexagonal boss 72 on gear 70 is suitable for engagement by a socket wrench or other means for turning the gear. Coaxially attached to gear 70 is a shaft 74 rotatably mounted to base extension 58, which is fixed relative to pillow block 12.

It is contemplated that wheel 40 will wear faster than impeller 22 or roller 26. Therefore it may me desirable to install a wheel slightly larger in diameter than wheel 40 in transmission 10 and gradually adjust the position of the wheel as it wears down. Such a slightly larger wheel is shown at 40a in FIG. 1A. In order to maintain relatively constant pressure by wheel 40a on impeller 22 and roller 26, wheel 40 contacts impeller 22 on tangent line 30a and contacts roller 26 along tangent line 32a. Additionally, axis 38 in FIG. 1A is moved slightly counterclockwise and away from pillow block 12 relative to that axis's position in FIG. 1. As wheel 40a wears down to the diameter of wheel 40, the tangential lines of contact will be shifted from lines 30a and 32a towards lines 30 and 32, and axis 38 and the wheel will be shifted clockwise and down toward pillow block 12.

Posts 34 and 36 accomplish the aforementioned shifting of the wheel and axis 38 as described in connection with the FIG. 5 detail view of post 36. Post 36 has a round shank 74 that closely and translatably fits in a blind bore 76 and rotates therein, both the bore and the shank being oblique to the upper surface of pillow block 12. At the upper end of shank 74 is yoke 78 to which clamp 80 is fastened by bolts 82 and 84 so as to form an eye in which spindle shaft 38 is journalled. When posts 34 and 36 rise, they turn spindle shaft 38 slightly clockwise as seen in FIGS. 1 and 1A while raising spindle shaft 38 away from the upper surface of pillow block 12. The posts swivel slightly in bores 76 as spindle shaft 38 turns so that the eyes remain coaxial with the spindle shaft and do not bind it.

Figure 4:
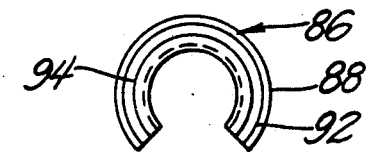
FIG. 4 is a plan view of a collet that fits on a post where the spindle shaft is mounted.
Figure 5:
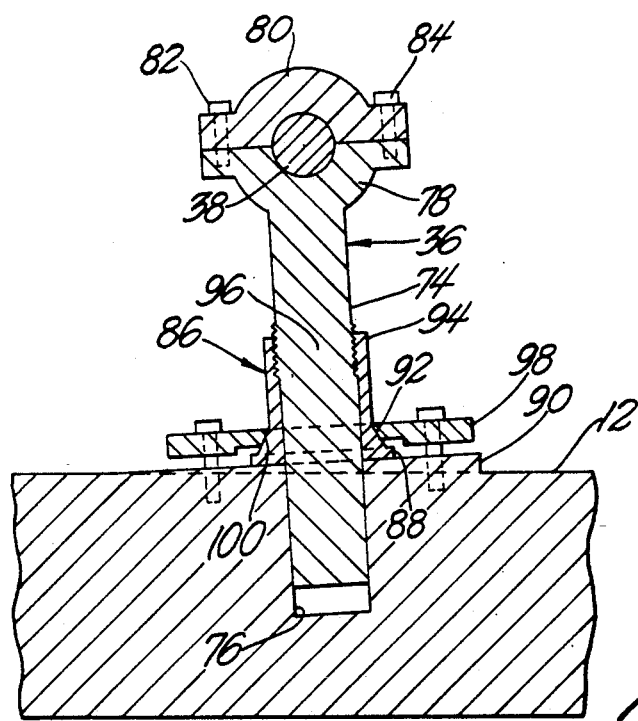
FIG. 5 is a view taken along 5—5 in FIG. 1 shows the post, collet and other elements comprising a means to lock the post in a selected position.

Posts 34 and 36 have a means for releasably locking in a selected position, this means including an open collet 86 shown in FIGS. 4 and 5. At the base of collet 86 is a flange 88 that rests upon wedge shaped pedestal 90 on pillow block 12. Collet 86 has an outer diametrical bevel 92 between flange 88 and internally threaded semicylindrical collar 94, the collar engaging complementary external threads at intermediate section 96 of shank 74. Collet 86 is a diametrically elastically deformable spring which in a free state will be expanded to release section 96 of shank 94 so that post 36 is loose in collet 86 and can be translated therethrough. Surrounding collet 86 is annular lock plate 98 having an inner circular bevel 100 bearing against bevel 92 such that downward movement of plate compresses collet 86 into threaded engagement with shank 74 and subsequent downward force of plate 98 squeezingly locks collet 86 and post 36 in a fixed position relative to pillow block 12.

Figure 6:
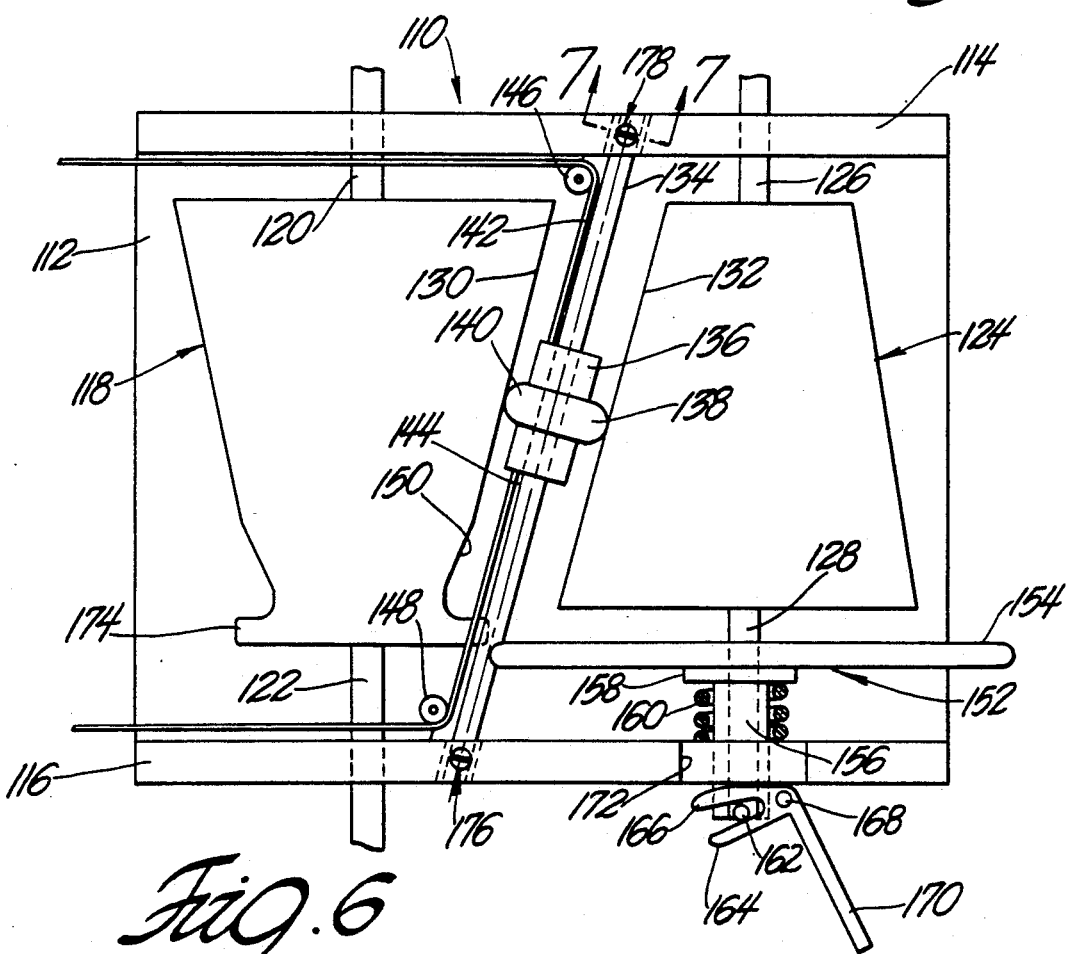
FIG. 6 is a plan view of a second, preferred embodiment of my transmission.

Another, and I believe preferred, embodiment of my transmission is shown at 110 in FIG. 6, wherein horizontal block or bed 112 has upright end walls or extensions 114 and 116 perpendicular to the bed. Impeller 118 is mounted between the walls by trunnions 120 and 122 whereas roller 124 is mounted between these walls by trunnions 126 and 128, impeller 118 and roller 124 having parallel axes of rotation. Connected between walls 114 and 116 is rotationally fixed, cross-sectionally polygonal shaft 134 upon which a sleeve 136 translates but does not rotate. Wheel 138 turns upon the sleeve about longitudinal sleeve axis 140 and engages impeller 118 and roller 124 at tangental lines 130 and 132 respectively, these tangental lines being parallel to axis 140. Wheel 138 is translatably stationary relative to sleeve 136.

Changing the relative rotational speed between impeller 118 and roller 124 is accomplished by moving wheel 138 along axis 140 by means of flexible cables 142 and 144 attached to opposite ends of collar 136. The cables are guided around bobbins 146 and 148 mounted to bed 112, the cables being kept under tension at all times and being pulled by levers (not shown) or like mechanisms. When wheel 138 is translated to a position along necked zone 150 of impeller 118, the wheel is disengaged from the impeller, whereby no power is transmitted to roller 124. In this circumstance, transmission 110 can be regarded as being in a neutral gear analogous, for example, to the neutral gear of a conventional automotive vehicle transmission.

When wheel 138 is at necked zone 150, clutch assembly 152 may be actuated to put the transmission in reverse gear, wherein the impeller and roller rotate in opposite directions. Clutch assembly 152 includes a clutch plate 154 rotationally fixed but axially translatable relative to trunnion 128. The assembly has a generally cylindrical carriage or actuator body 156 which is translatable relative to trunnion 128 through wall 116 but does not rotate. Tension spring 160 is fastened between the actuator body's rimlet 158 and wall 118, the spring biasing the body 156 away from clutch plate 154. Protruding from body 156 is pin 162 upon which arms 166 and 168 on lever 170 act in order to translate the body, the lever being pivoted on pintle 168. Wide groove 172 accommodates clockwise movement of the arms when lever 170 effects engagement between clutch plate 154 and clutch engagement shoulder 174 impeller 118. Clockwise pivoting of lever 170 translates actuator body 156 toward clutch plate 154 against the bias of spring 160, whereby clutch body 156 forces the clutch plate 154 into engagement with shoulder 174.

Figure 7:
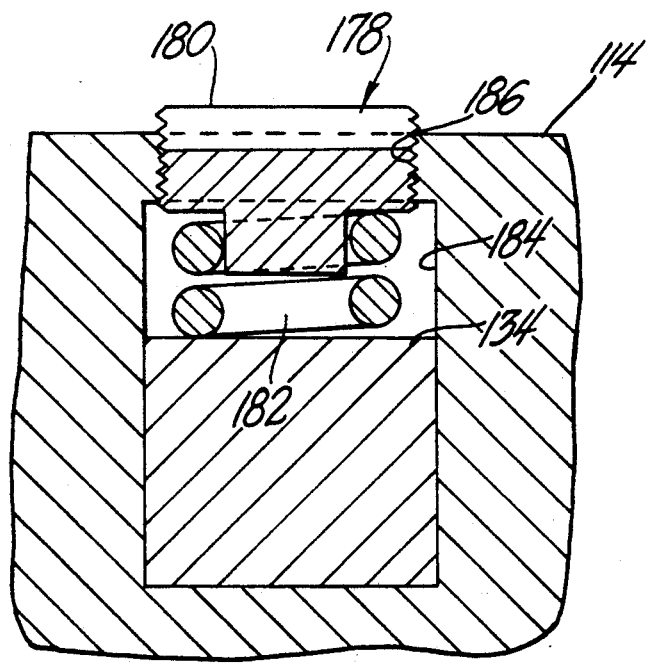
FIG. 7 is a view taken along line 7—7 in FIG. 6 showing details of a means for adjusting the force with which the transfer wheel contacts the impeller and roller.

Transmission 110 has adjustable clench mechanisms 176 and 178 for controlling the pressure of wheel 138 on impeller 118 and roller 124, a sectioned view of mechanism 178 being shown in FIG. 7. Wall 114 has a rectangular orifice 184 through which polygonal shaft 134 closely and slidably fits, the shaft bearing upon the bottom of the orifice. At the top of orifice 184 is threaded bore 186 accommodating the threaded head of adjustment bolt 180 that has shank 185 extending into the orifice. Encircling the shank and compressed against the top of shaft 134 is coil spring 182, whereby turning bolt 180 changes the spring's force on shaft 134.

The head of bolt can be calibrated so that specific rotational positions thereof will effect corresponding selected spring forces acting on shaft 134. It would be preferable, however, to turn bolt 180 until a predetermined torque is achieved while wheel 138 is engaged with impeller 118 and roller 124, so that there is a direct measurement that corresponds to the pressure of the wheel on the impeller and roller. It may be desired in some instances that wheel pressure vary linearly as wheel 138 translates along axis 140, and such an effect is achieved by making the torque on bolt 180 unequal to the torque on the corresponding bolt associated with clench mechanism 176. Of course, nonlinear wheel pressure variation can be achieved by slightly modifying the profile of either impeller 118 or roller 124 such that tangent line 130 or 132 is not perfectly straight.

Figure 8:
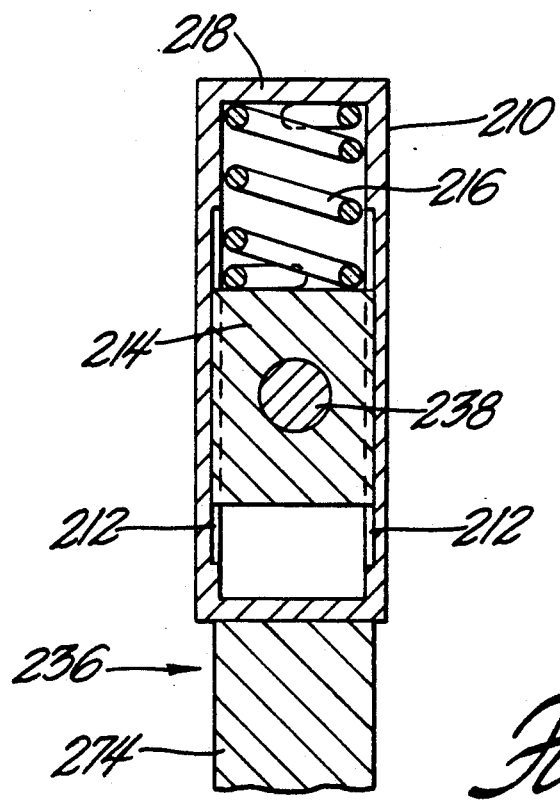
FIG. 8 is a sectional view of an alternate structure for the post shown in FIG. 5.

FIG. 8 shows a modified post 236 which may optionally replace post 36 in FIG. 5. Pillow block 12 and open collet 86 are not shown in FIG. 8. Atop shaft 274 is a box-shaped guide having elongated channels 212 along which slides yoke block 214. Journalled in yoke block 214 spindle 238 analogous to spindle 38 in FIG. 5, a downward bias acting on spindle 238 because of spring 216 compressed between end 218 of guide 210 and block 214. If two posts such as post 236 replaced post 36 in FIGS. 1 and 2, then springs 216 will bias spindle 38 counterclockwise and down as seen in those figures. Spindle 38 will move in the direction of the bias as transfer wheel 40 wears, whereby the height of post 36 will not need to be adjusted as otherwise would be the case. It may be possible to eliminate height adjustments for posts 36 altogether.

I wish it to be understood that I do not desire to be limited to the exact details of construction shown and described herein since obvious modifications will occur to those skilled in the relevant arts without departing from the spirit and scope of the following claims.

I claim:

1. An infinitely variable transmission, comprising:
   a block;
   a roller rotatably mounted to the block, the roller having a frusto-conical roller surface, a smaller diameter roller end and a larger diameter roller end;
   an impeller rotatably mounted to the block alongside the roller, the impeller having a frustoconical impeller surface, a smaller diameter impeller end and a larger diameter impeller end, the smaller diameter impeller end being in opposed relation to the larger diameter roller end;
   the roller having a roller tangent line in the same plane as a rotational axis of the roller and on the roller surface;
   the impeller having an impeller tangent line in the same plane as a rotational axis of the impeller and on the impeller surface;
   a transfer wheel contacting the impeller tangent line and the roller tangent line;
   control means for translating the wheel along the tangent lines;
   a spindle;
   a spindle axis along which the wheel translates;
   spindle mounting means for mounting the spindle on the block, the spindle mounting means comprising
      a smooth round end closely and slidably fit in the block so that the mounting means can rotate and translate relative to the block, the smooth round end oriented obliquely to a surface of the block facing the roller and impeller;
      an outer portion defining an orifice accommodating the spindle;
   locking means for releasably locking the spindle mounting means in an fixed position relative to the block.

2. The transmission of claim 1 wherein the locking means comprises:
   an open collet partly encircling a section of the spindle mounting means;
   as inclined pedestal on the block, one axial end of the collet bearing against the pedestal;
   an outer diametrical bevel on the collet;
   a lock plate encircling the collet, the lock plate having an inner diametrical bevel faced toward the outer diametrical bevel;
   means for forcing the inner diametrical bevel against the outer diametrical bevel.

3. An infinitely variable transmission, comprising:
   a block;
   a roller rotatably mounted to the block, the roller having a frusto-conical roller surface, a smaller diameter roller end and a larger diameter roller end;
   an impeller rotatably mounted to the block alongside the roller, the impeller having a frustoconical impeller surface, a smaller diameter impeller end and a larger diameter impeller end, the smaller diameter impeller end being in opposed relation to the larger diameter roller end;
   the roller having a roller tangent line in the same plane as a rotational axis of the roller and on the roller surface;
   the impeller having an impeller tangent line in the same plane as a rotational axis of the impeller and on the impeller surface;
   a transfer wheel contacting the impeller tangent line and the roller tangent line;
   control means for translating the wheel along the tangent lines;
   a mount having a mount axis oblique to the block, the mount axis being perpendicular to an axis of rotation of the transfer wheel;
   a guide on the mount;
   means for journalling a spindle, the journalling means translatable with respect to the guide along the mount axis;
   means for biasing the journalling means downward along the mount axis.

4. An infinity variable transmission, comprising:
   a block having two extensions protruding therefrom;
   a first spinning member comprised of a roller rotatably mounted to the block, the roller having a frusto-conical roller surface, a smaller diameter roller end and a larger diameter roller end;
   a second spinning member comprised of an impeller rotatably mounted to the block, the impeller having a frusto-conical impeller surface, a smaller diameter impeller end, and a larger impeller end, the smaller diameter impeller end being in opposed relation the larger diameter roller end;
   a shaft mounted between the two extensions;
   a collar translatable on the shaft;
   a transfer wheel mounted on the collar;
   cables connected to the collar whereby pulling one of the cables translates the collar and wheel;
   wherein a selected spinning member has an engagement shoulder protruding radially from the frustoconical surface, the transmission further comprising:
   a clutch plate axially aligned with the shoulder;

means for moving the clutch plate into engagement with the shoulder.

5. The transmission of claim 4 including means for mounting the shaft to the block, wherein:
the shaft has a polygonal cross section;
the mounting means defines a mounting orifice for the shaft, the orifice having a flat side against which bears the shaft and an opposing side faced toward the flat side,
the opposing side defining a bore;
the orifice having parallel sides between the flat side and the opposing side, the shaft fitting closely and slidably between the parallel sides;
a movable adjustment member in the bore;
a spring positioned between the adjustment member and the shaft such that moving the adjustment member varies the force of the spring acting on the shaft.

6. The transmission of claim 5 wherein:
the adjustment member is rotatable in the bore coaxially therewith;
the bore and adjustment member have complementary threads;
the spring directly engages the shaft;
whereby turning the adjustment member varies the force with which the spring acts on the shaft.

* * * * *